Oct. 25, 1966

J. R. KEIM ETAL 3,281,602

TURBIDIMETER USING PHOTOELECTRIC LINEARIZING CIRCUIT

Filed Sept. 20, 1963

INVENTORS.
JONATHAN R. KEIM
LEWIS A. MEDLAR

BY Arthur H. Swanson

ATTORNEY.

United States Patent Office 3,281,602
Patented Oct. 25, 1966

3,281,602
TURBIDIMETER USING PHOTOELECTRIC
LINEARIZING CIRCUIT
Jonathan R. Keim, Narberth, and Lewis A. Medlar, Lansdale, Pa., assignors to Honeywell Inc., a corporation of Delaware
Filed Sept. 20, 1963, Ser. No. 310,259
3 Claims. (Cl. 250—218)

It is an object of the present invention to disclose a turbidimeter to measure accurately the suspended materials in fluids such as, for example, the suspended material in raw river water.

Prior to the present invention it has been one of the practices in measuring the turbidity of a fluid to direct a beam of light, from a light source, through the top surface of a fluid and into contact with submersed, suspended material in the fluid. Standard photoelectric cells and recorder means have also been employed with these light-emitting units to measure the light reflected by the particles in suspension in order to obtain a turbidity measurement of the fluid.

Experimentation has shown that for changing turbid characteristics of the fluid the relationship between an electrical signal which is produced and indicated by the aforementioned photoelectric cell and recording means will be non-linear with respect to a standard Jackson Candle 25–5,000 Turbidity Unit Scale with which the fluid being measured is initially calibrated. This scale is explained in "Standard Methods for the Examination of Water and Waste Water" (pages 261 and 262, section 2), 11th edition, pub. 1960 by the American Public Health Association, the American Water Works Association and the Water Pollution Control Federation.

To eliminate this non-linearity it is, therefore, an object of the present invention to disclose an electrical circuit that will continuously maintain the output signal which the aforementioned photocells are capable of producing and transmitting to its associated turbidity recorder, in a linear relationship with respect to the Jackson Candle Unit Scale against which the fluid under measurement is initially calibrated.

More specifically, it is an object of the present invention to disclose a linearizing, voltage-dividing circuit that is comprised of a photoresistive cell, whose resistance is inversely proportional to the light reflected from a turbid fluid, and a photovoltaic cell whose voltage increases in a non-linear proportional manner with the Jackson Candle Unit Scale of the turbid fluid.

More specifically, it is another object of the present invention to disclose a modified form of the linearizing, voltage-dividing circuit referred to supra that is comprised of a photoresistive cell of the aforementioned type and a plurality of photovoltaic cells of the type referred to supra.

Another object of the invention is to disclose a water-sampling tank having an inlet port in its middle side wall portion, a conical-shaped, fluid outlet at its bottom end portion, and a spillway or leveling plate and a second fluid outlet at its top end portion for obtaining a substantially fixed level of a flowing stream of fluid at different flow rates therethrough.

It is another object of the present invention to disclose a structure for supporting the aforementioned photoresistive and photovoltaic cells at equal distances behind and above a flat glass surface on a peripheral portion of a flat ring plate so that the cells will always be maintained at a fixed preselected distance from the top surface of the fluid.

Another object of the invention is to provide the top inner portion of the aforementioned tank with the aforementioned internal spillway to continuously maintain the upper surface of the fluid flowing out of the top of the tank at a fixed level and in a substantially flat state.

Photoelectric cells which have heretofore been used to measure turbidity have not been satisfactory in measuring the turbid condition of such fluids as raw water because the output signal that they produce is not linear with respect to the Jackson Candle Turbidity Scale against which they are calibrated. Special charts and conversion tables, etc., are, therefore, required to be employed before or after these non-linear signals are transmitted to a remote location.

It is, therefore, another object of the present invention to disclose a turbidimeter that is constructed to continuously produce an output signal that is always linear with respect to the Jackson Candle Turbidimeter Scale and thus avoid the uncorrected voltage recording and transmitting inconveniences which are encountered with the aforementioned, presently-available turbidimeters.

It is another object of the invention to provide a single circuit of the aforementioned, linear, signal-producing type whose electrical output voltage level characteristic can be raised and lowered so that it will be useful in continuously measuring in an accurate linear manner different turbidity characteristics that take place in individual or combined streams of raw river water or other fluids that contain characteristically different types of suspended material therein.

A better understanding of the present invention may be had from the following detailed description when read in connection with the accompanying drawings in which.

Figure 1:
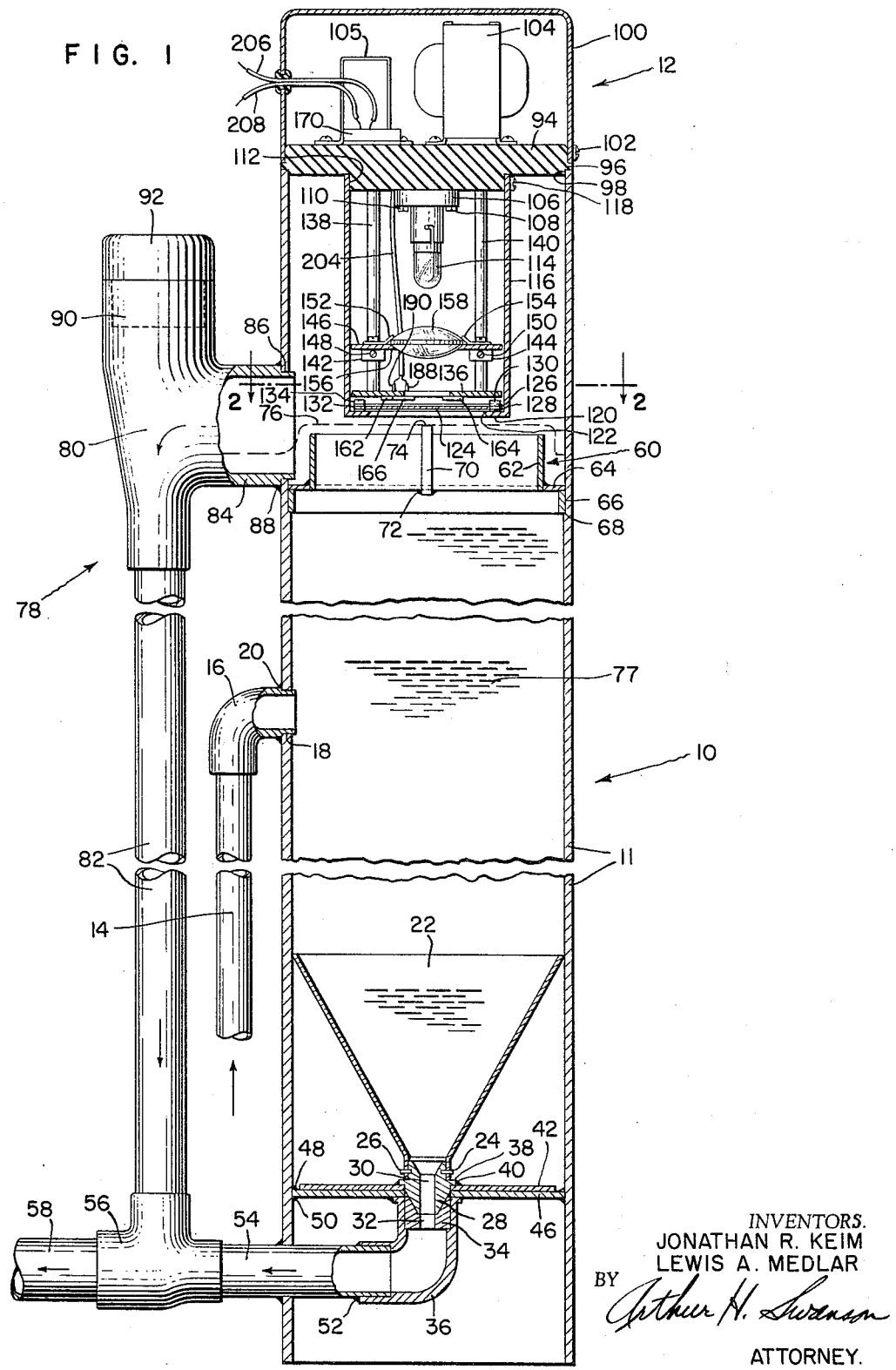
FIG. 1 is a partial side elevation view of the water-sampling tank and a turbidimeter associated therewith.

FIG. 1 shows a water-sampling tank 10 having a side wall 11 and a removable, turbidity-sensing unit 12 mounted on its upper end surface.

The wall 11 of the tank 10 has a non-reflective, algae-resistant black coating covering its inner side wall surface and has a fluid-tight inlet passageway that is comprised of a conduit 14 and an elbow 16 extending from its upper end. The elbow 16 is shown passing through wall surface 18, forming an aperture in a side wall 9 of a tank 10, and is soldered in a fluid-tight manner at 20 to the outer circumferential surface of the side wall 11.

The tank 10 is also comprised of a bottom outlet which is in the form of a removable funnel 22. The lower portion of funnel 22 has a pair of pins 24, 26 passing therethrough to retain it in position on a hollow member 28. The member 28 has a passageway 30 formed in its central portion that forms an open connection between the lower end of the funnel 22 and a passageway 32 formed by the inner wall of a sleeve 34 whose outer side wall surface is press fitted into the upper end of the elbow 36.

The member 28 has an outer, circular-shaped lip portion 38 that is soldered to form a fluid-tight joint at 40 with a ring-shaped plate 42. The lower surface of the ring-shaped plate 42 rests on the top surface of the bottom plate 46 of the tank 10. It can be seen from the aforementioned description that the funnel 22, hollow member 28 and the ring plate 42 can be removed as a unit. Use of the funnel can be employed when the high concentration of solid particles in the fluid tends to clog the lower passageway 32. The outer, peripheral top and bottom portions of the bottom plate 46 are soldered to the inner side wall surface 11 of the tank 10 to form a water-tight joint 48, 50.

The left, peripheral end portion of the elbow 36 is soldered to form a fluid-tight joint 52 with the right end of the drain conduit 54. The left end of the conduit 54 is, in turn, connected in a fluid-tight manner to the right end of a reducing T 56 that, in turn, has a drain pipe extension 58 extending from its left end.

The upper end of the tank 10 is provided with a spillway plate 60 that is comprised of an integral, vertical, ring-shaped portion 62 and a flat, ring-shaped, base portion 64 that, in turn, is supported by a ring-shaped plate 66. The ring-shaped plate 66 is mounted on an annular recess 68 formed in the inner wall surface 11 of the tank 10.

The lower end of a liquid level indicating L-shaped bracket 70 is fixedly connected by a suitable soldered joint 72 to the base portion 64. The upper end portion 74 of the bracket 70 protrudes in a horizontal plane that coincides with the fixed, upper level surface 76 of the fluid 77 that is retained within the side wall 11 of the tank 10.

An overflow drain conduit 78 is comprised of a reducing T 80 and a conduit 82 that connects the T 80 with the upper branch of the previously-referred-to T 56.

The horizontal branch 84 of the T 80 is supported by a wall surface 86 that forms an aperture in the side wall 11 of the tank 10. This branch 84 of the T 80 is connected to the outer surface of the tank wall 11 by way of a soldered, fluid-tight joint 88. The upper, vertical branch 90 of the T 80 is shown removably inserted therein.

The removable turbidity-sensing unit 12 is comprised of a support member 94 containing an outer, cylindrical rib portion 96 thereon. The bottom surface of this rib portion 96 and the cylindrical portion 98 are shown supporting the sensing unit 12 in a rotatable position on the top end of the tank wall 11.

The lower end of a wall forming a cup-shaped housing 100 is seated on the top surface of the rib 96 and is retained in place on the support member 94 by means of suitable screw connection 102.

FIG. 1 schematically shows a conventional, voltage regulating transformer 104 and a condenser 105 mounted on the top surface of the support member 94.

A bayonet light socket 106 is mounted by means of screw connections 108, 110 on the lower surface of a cylindrical, embossed portion 112 of the support member 96.

An electrical radiant energy source such as a light bulb 114 is mounted in the socket member 106. The electrical light bulb 114 is electrically connected with the voltage regulating transformer 104 and its associated condenser unit 105 by wires, not shown, which pass through holes in the support member 94. This transformer 104 and condenser unit 105 are thus electrically connected to enable the light being emitted from the light bulb 114 to be maintained at a constant value.

The upper end of a sleeve 116 is shown fixedly connected at its top end to an outer cylindrical surface of the embossed portion 112 by means of a suitable screw connection, such as the connection 118.

The lower end of the sleeve 116 has an annular lip 120 that is made integral therewith and which forms an inner, peripheral surface of the sleeve 116. The lip 120 is shown terminating in a beveled wall surface 122 that provides a light-emitting aperture at the lower end of the sleeve 116.

A transparent protecting plate such as a soda-lime window glass 124 is shown extending across the light-emitting aperture and as being supported on the top, inner surface of the lip 120.

A glass retaining ring 126 is fixedly mounted by means of a suitable number of spaced-apart screw and washer connections 128, 130, 132, 134, on the lip 120.

A disc 136 made of an insulating material such as a plastic material is supported in the spaced-apart position shown above the glass window 124 by means of a suitable number of spaced-apart tie bolts 138, 140 whose upper ends are threadedly connected to the previously-referred-to support member 94.

The sleeves 142, 144 that are integral with the circular ring plate 146 are mounted in a slidably-adjusted, preselected, fixed position on the tie bolts 132, 140 by means of the set screws 148, 150.

A suitable number of spaced-apart, screw-retained spring clips 152, 154 are shown applying a spring force in a downward direction to retain the spherical lens 156 in a fixed position against the inner curved surface 158 of the ring plate 146.

All of the previously-referred-to parts which surround the light bulb 114 and spherical lens 154 are made of either a metallic material covered with a coating such as black oxide or an equivalent black-colored plastic having similar non-reflecting light properties.

Figure 2:
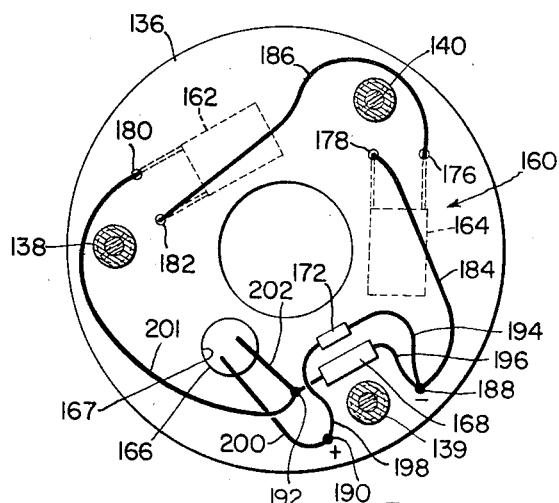
FIG. 2 is a view of a part of the turbidimeter per se that is taken along section line 2—2 of FIG. 1.

FIG. 2 shows a circuit 160 for producing a linear signal representing the turbidity of the fluid 77. This circuit 160 is particularly useful in producing a voltage signal for fluids that possess turbidity characteristics that extend through the lower range portions of the aforementioned Jackson Candle Scale.

The electrical output characteristics of the first radiant energy detector in the form of a photovoltaic cell 162, 164, together with a second radiant energy detector in the form of a photo-resistive cell 166 and a load resistance 168 forming the previously-mentioned, voltage-dividing portion of the circuit introduces into the circuit, for the first time, a very satisfactory way of producing a voltage signal representative of the turbidity of raw river water or of other fluids having non-homogeneous, suspended matter therein in Jackson Candle Units.

Figure 3:
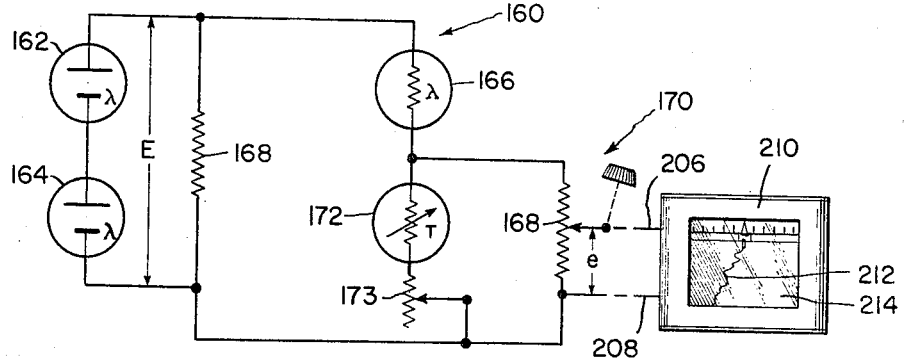
FIG. 3 is a view showing how the photovoltaic and photoresistive cells are combined in a circuit to produce a signal that is linear with respect to the previously-referred-to Jackson Candle Scale.

The aforementioned, photoelectric, linearizing circuit is also provided with a thermistor 172, as shown in FIGS. 2 and 3, to negate any undesired, deleterious effect that a change in ambient temperature of the atmosphere surrounding the cells 162, 164, 168 would otherwise have on the electrical output characteristics of these cells. A rheostat 173 is employed to alter the degree of ambient temperature compensation provided by thermistor 172.

Figure 3A:
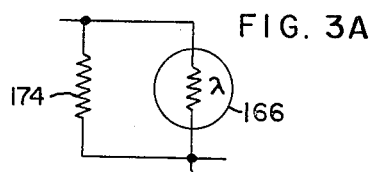
FIGURE 3A shows a partial view of the circuit, shown in FIGURES 3 and 4, describing how a resistor can be inserted in these circuits to alter the magnitude of the linearizing effect of these circuits.

The aforementioned, photoelectric, linearizing circuit can also be provided with a resistance 174, as shown in FIG. 3A. This resistance can be inserted into the circuit when it is desired to alter the magnitude of the linearizing effect of the aforementioned, described circuit.

A plurality of apertures 176, 178, 180, 182 is shown passing through the disc 136 in FIG. 2 of the drawing to enable the electrical connections 184, 186 to be passed therethrough.

FIG. 2 also shows terminals 188, 190, 192 between the following groups of electrical leads: 184, 194, 196; 198 and 200; and 201 and 202.

Figure 4:
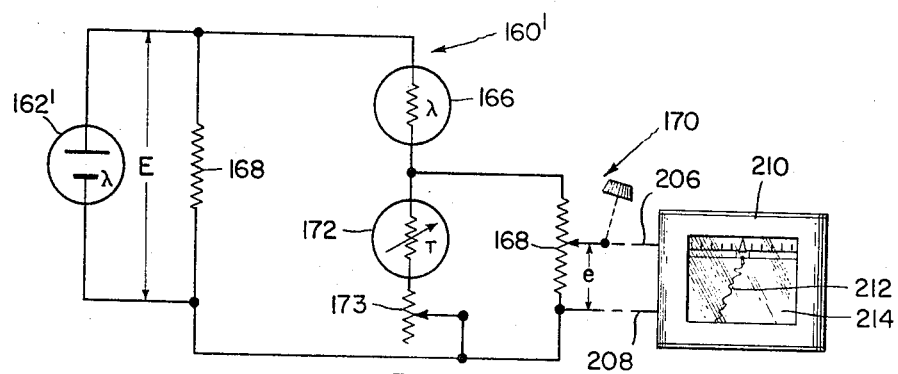
FIG. 4 shows another modified linearizing circuit that is similar to the circuit shown in FIG. 3.

The terminals 188 and 190 shown in FIGS. 1 and 2 are, in turn, connected by electrically-insulated, wire-transmitting member 204 containing the electrical conductors 206, 208, as shown in FIG. 1, and FIGS. 3 and 4 show how these conductors 206, 208 can be connected to a remotely-located turbidity recorder 210 where a variable millivolt signal can be recorded in the corrected linear output voltage form 212 on the chart 214. The recorder 210 is of a well-known, self-balancing, null-type, recording potentiometer such as that which is disclosed in the Walter P. Wills Patent No. 2,423,540, filed December 1, 1941, issued July 8, 1947.

The light from the light source 114 is focused by lens 154 through the top surface 76 of the fluid 77 into contact with the submersed suspended materials contained therein. The portion of the aforementioned circuit that is used to sense the back scattered light from the suspended material in the fluid is comprised of two photovoltaic cells 162, 164 fixedly mounted on the bottom of plate 136 and a photoresistive cell 166 that is fixedly mounted to the circular wall 167 forming an aperture in plate 136. The output of the photovoltaic cells 162, 164 is a millivoltage E and is shown in FIG. 3 applied to a voltage divider which is comprised of the resistance introduced by photoresistive cell 166 and the resistance 168 of the manually-adjusted potentiometer 170.

Figure 5:
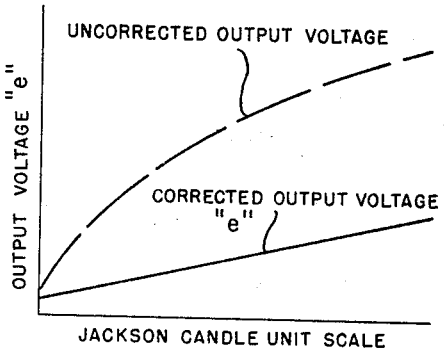
FIG. 5 is a graph showing the beneficial linearizing or corrected output voltage effect obtained with aforementioned turbidimeter.

The manual adjustment of the potentiometer 170 provides a means for varying the level of the corrected linearized output signal $e$, as shown in FIG. 5. The resistance introduced into the circuit by the photoresistive cell 166 will be inversely proportional to the back scattered light it receives from the aforementioned suspended materials in the fluid 77 under measurement. Thus, as the reflected light from flowing, turbid fluid 77 is increased, the output of the photovoltaic cells 162, 164 will also be increased and the resistance of the photoresistive cell 166 will be decreased.

It can thus be seen from the aforementioned description that the output voltage $e$ which is a portion of the input voltage E will be simultaneously increased as the magnitude of the voltage E is increased.

When a fluid contains a suspended material such as fuller's earth or other similar material in suspension, its turbid characteristics can be readily obtained in linear Jackson Candle Units by employing a light-emitting means to pass light into a fluid and by employing a single conventional photocell to measure the light reflected therefrom. If the same light sensing means were used to sense the turbidity of river water, a linear measurement of the aforementioned type could not be obtained, because of the non-homogeneity of the light-scattering, suspended material contained therein. The present disclosure solves this problem by employing the aforementioned photovoltaic cells 162, 164 and photoresistive cell 166 together with a load resistance 168 connected in parallel with the cells 162, 164 as shown in FIG. 3. With this circuit arrangement, the output voltage of the cells 162, 164 will be varied directly with its load resistance. This result is brought about because the voltaic cells are basically current output cells.

FIG. 4 shows a linearizing circuit 160¹ which is similar to the circuit already set forth under the description of FIG. 3 except that in the FIG. 4 version only a single voltaic cell 162 is used in lieu of the multiple cell 162, 164 arrangement that is shown in FIG. 3.

Experimentation has shown that the linearizing circuit 160¹ shown in FIG. 4 can be employed to measure in a desired accurate manner, for the first time, the turbidity of fluids such as a fluid containing non-homogeneous, suspended matter therein that extends through upper range portions of the aforementioned Jackson Candle Scale.

The curved line, identified in FIG. 5 as the uncorrected output voltage, represents the type of non-linear voltage that would normally be produced when the turbidity-measuring and transmitting circuit of the type identified by reference numeral 12 is not employed to measure any fluid that contains non-homogeneous, suspended materials therein such as raw river water.

The straight line shows the effect that the unique, turbidity-measuring and transmitting circuit 12 disclosed herein has in making the voltage output of the circuit linear with respect to the Jackson Candle Unit Scale.

In the operation of the aforementioned apparatus it can be seen that the tank 10 is constructed so that the fluid 77 whose turbid content is to be measured is pumped under pressure from a fluid source, not shown, through the side wall 11 by way of the inlet conduit 14, and an elbow 16 into the tank 10 in the direction indicated by the arrows.

The construction is such that the fluid 77 flows into the tank 10 at a higher rate than the rate at which it is drained through the passageways 30, 32, elbow 36 and conduit 54 which constitutes a bottom drain of the tank 10. When the level of the fluid in the tank 10 reaches the upper surface 76 of the fluid level indicating bracket 70, it will then flow in a very smooth manner over the sides of the spillplate 62 as shown in FIG. 1 and thence through the top drain 78.

It can thus be seen from the aforementioned description that this construction allows the upper level 76 of the fluid 77 to always remain flat and at a fixed level because of the large upper edge surface of the spillplate 62 over which the rising water in the tank 10 is allowed to flow. The large lower level area into which the fluid 77 is thereafter allowed to be dispensed before it enters the drain 78 is another useful part of the tank construction that will carry the fluid 77 from the tank into the drain pipe at a desired rate so that the upper level 76 of the fluid 77 can be maintained by the spillplate at a fixed height.

Experimentation has shown that it is absolutely necessary to prevent the suspended materials in the fluid 77 from accumulating in the bottom of the tank because this condition will reduce the rate at which fluid can flow through the bottom drain and thereby cause the level 76 of the fluid 77 to rise beyond the desired, substantially-fixed level shown in FIG. 1 of the drawing.

To obviate this problem, a removable tank-funnel structure 22 is provided which will prevent the suspended material in the fluid 77 from settling out and accumulating in an undesired manner in the bottom of the tank.

From the previous disclosure, it can be seen that a circuit has been set forth which utilizes at least one photovoltaic cell whose voltage increases in a non-linear manner with the light reflected from a fluid whose turbidity is to be measured. It can further be seen that this circuit also advantageously employs a photoresistive cell as a part of a voltage-dividing portion of the circuit to modify the resistance therein in a manner that is inversely proportional to the light reflected from the fluid so that a linear millivolt output signal can be produced by the circuit which is linear with the Jackson Candle Unit Scale.

The present disclosure thus presents a tank having a centrally-located fluid inlet, a constant fluid-leveling top spillplate drain and a funnel-shaped bottom drain to enable a constant columnar length of fluid to be available for measurement by a turbidity-sensing unit having a unique photoelectric sensing circuit. The circuit disclosed herein is unique in that it is capable of producing a measurable electric signal that is linear with respect to the Jackson Candle Unit Scale of the fluid whose turbidity is to be measured.

What is claimed is:

1. An apparatus to produce an electrical signal that is linear with respect to the Jackson Candle Unit Scale of a turbid fluid which has characteristically different types of suspended material therein, comprising an electric light source spaced at a fixed distance from the fluid to direct light into the fluid, a transparent protecting plate positioned between the light source and the fluid, a disc spaced from and out of contact with the fluid, at least one photovoltaic cell and a photoresistive cell surrounding and immediately adjacent the light that is directed into the fluid, said photoresistive cell being electrically connected with the photovoltaic cell, a light sensitive area of each cell being positioned on the disc adjacent a wall portion that forms a light passing aperture therein to face the fluid at a location between the light source and a wall portion forming an aperture in the protecting plate to thereby sense the scattered, reflected light emitted from the suspended material in the fluid that is passed through the aperture formed by the wall of the protecting plate and a load resistance connected in parallel with the photoresistive cell, a tank, an inlet inside of the tank to accommodate different flow rates of the turbid fluid passing into the tank, a first drain at the bottom of the tank, a spillway, and a second drain connected to the spillway positioned at the top of the tank constructed to maintain a fixed distance between the top of the fluid in the tank and the protecting plate as the inlet flow rate of the fluid is altered.

2. An apparatus to produce an electrical signal that is linearly proportional to the Jackson Candle Unit Scale of a turbid fluid which has characteristically different types of suspended material therein, comprising an electric light source spaced at a fixed distance from the fluid to direct light in a downward direction into the fluid, a transparent protecting plate positioned between the light source and the fluid, at least one photovoltaic cell, a photoresistive cell electrically connected wtih the photovoltaic cell and juxtapositioned at the same fixed distance from the fluid between the light source and the protecting plate to sense the scattered, reflected light emitted from the suspended material in the fluid, and a load resistance connected in parallel with the photoresistive cell and a tank having inlets and outlets constructed to maintain the fluid being transmitted therethrough at the same level below the transparent protecting plate to thereby maintain the plate in a clean condition while changes occur in the inlet flow rate of the fluid.

3. A linearizing voltage-dividing circuit for transforming radiant energy emitted from a turbid fluid into an electrical output signal that is linear with respect to the Jackson Candle Unit Scale of the fluid, comprising a first radiant energy responsive means to produce a voltage in the circuit that changes in a non-linear proportional manner with changes in the turbidity of the fluid, and a second radiant energy responsive means operably connected to a load resistance in the circuit to alter the resistance in the circuit in an inverse manner with respect to the reflected radiant energy emitted from the turbid fluid, wherein a tank is employed to accommodate a continuous flow of the turbid fluid therethrough, a centrally located inlet passageway is provided in the side of the tank, a spillway and a first connecting outlet passageway are at one end of the inner end portion of the tank and a removable funnel and a second connecting outlet passageway are at the opposite inner end portion of the tank, and said spillway and funnel providing a substantially constant columnar length of fluid in the tank as the fluid is passed through the tank at different flow rates.

References Cited by the Examiner
UNITED STATES PATENTS

| | | | |
|---|---|---|---|
| 3,028,499 | 4/1962 | Farrall | 250—209 |
| 3,031,915 | 5/1962 | Pelavin | 250—226 X |
| 3,062,963 | 11/1962 | Douty | 250—218 |
| 3,177,760 | 4/1965 | Albert | 88—14 |
| 3,179,808 | 4/1965 | Grey et al. | 250—209 |

RALPH G. NILSON, *Primary Examiner.*

WALTER STOLWEIN, *Examiner.*